(12) United States Patent
Palmer

(10) Patent No.: US 10,926,409 B1
(45) Date of Patent: Feb. 23, 2021

(54) SYSTEMS AND METHODS FOR CONTROLLING WALKING ROBOTS

(71) Applicant: Luther Robert Palmer, Tampa, FL (US)

(72) Inventor: Luther Robert Palmer, Tampa, FL (US)

(73) Assignee: University of South Florida, Tampa, FL (US)

( * ) Notice: Subject to any disclaimer, the term of this patent is extended or adjusted under 35 U.S.C. 154(b) by 423 days.

(21) Appl. No.: 14/919,382

(22) Filed: Oct. 21, 2015

Related U.S. Application Data

(60) Provisional application No. 62/066,616, filed on Oct. 21, 2014.

(51) Int. Cl.
*B25J 9/16* (2006.01)
*B25J 5/00* (2006.01)

(52) U.S. Cl.
CPC ............... *B25J 9/1633* (2013.01); *B25J 5/00* (2013.01); *Y10S 901/01* (2013.01)

(58) Field of Classification Search
CPC ........... B25J 9/1633; B25J 5/00; Y10S 901/01
See application file for complete search history.

(56) References Cited

U.S. PATENT DOCUMENTS

| | | | |
|---|---|---|---|
| 5,841,258 A | 11/1998 | Takenaka | |
| 8,630,763 B2 | 1/2014 | Goulding | |
| 9,789,920 B2* | 10/2017 | Hurst | B62D 57/032 |
| 9,821,866 B1* | 11/2017 | Urata | B62D 57/032 |
| 2007/0013506 A1* | 1/2007 | Takenaka | B25J 13/085 |
| | | | 340/500 |
| 2008/0109115 A1 | 5/2008 | Lim | |
| 2010/0113980 A1* | 5/2010 | Herr | A61F 2/60 |
| | | | 600/587 |
| 2011/0082566 A1* | 4/2011 | Herr | A61F 2/60 |
| | | | 623/24 |
| 2011/0224827 A1* | 9/2011 | Andoh | B62D 57/032 |
| | | | 700/258 |

FOREIGN PATENT DOCUMENTS

CN     102530121 B     8/2013

OTHER PUBLICATIONS

Allen T., Quinn R., Bachmann R., Ritzmann R. (2003) Abstracted biological principles applied with reduced actuation improve mobility of legged vehicles. In: Proceedings of the IEEE/RSJ International Conference on Intelligent Robots and Systems, pp. 1370-1375.

(Continued)

*Primary Examiner* — Robert T Nguyen
(74) *Attorney, Agent, or Firm* — Thomas | Horstemeyer, LLP

(57) ABSTRACT

In one embodiment, a walking robot includes a robot body, multiple legs attached to and extending from the body, at least one leg including a pivot joint having an initial zero position and a foot that is adapted to contact a ground surface, wherein force applied to the foot because of contact with the ground causes the leg to pivot about the pivot joint, and an angular position sensor associated with the pivot joint and configured to measure a pivot angle through which the leg has pivoted about the pivot joint, the angle being related to the force applied to the foot.

17 Claims, 14 Drawing Sheets

(56) References Cited

OTHER PUBLICATIONS

Altendorfer R., Moore N., Komsuoglu H., Buehler M., Brown J. H.B., McMordie D., Saranli U., Full R., Koditschek D. (2001) Rhex: A biologically inspired hexapod runner. Autonomous Robots 11:207-213, Anonymous (1967) Logistical vehicle off-road mobility. Tech. rep., U.S. Army Transportation Combat Developments Agency, Fort Eustis, VA.
Bender J., Simpson E., Tietz B., Daltorio K., Quinn R., Ritzmann R. (2011) Kinematic and behavioral evidence for a distinction between trotting and ambling gaits in the cockroach blaberus discoidalis. Journal of Experimental Biology 214:2057-2064.
Cruse H. (1985) Which parameters control the leg movement of a walking insect?: I. velocity control during the stance phase. Journal of Experimental Biology pp. 343-355.
Cruse H., Kindermann T., Schumm M., Dean J., Schmitz J. (1998) Walknet—a biologically inspired network to control six-legged walking. Neural Networks 11(78)1435-1447.
Ekeberg O., Blumel M., Buschges A. (2004) Dynamic simulation of insect walking. Arthropod Structure and Development 33(3):287-300.
Full R. J. (1989) Mechanics and energetics of terrestrial locomotion: From bipeds to polypeds. Energy Transformation in Cells and Animals pp. 175-182.
Full R. J., Koditschek D. E. (1999) Templates and anchors: neuromechanical hypotheses of legged locomotion on land. Journal of Experimental Biology 202:3325-3332.
Full R. J., Tu M. (1990) The mechanics of six-legged runners. Journal of Experimental Biology 148:129-146.
Full R. J., Blickhan R., Tu M. (1991) Leg design in hexapedal runners. Journal of Experimental Biology 158:369-390.
Goldman D. I., Chen T. S., Dudek D. M., Full R. J. (2006) Dynamics of rapid vertical climbing in cockroaches reveals a template. Journal of Experimental Biology 209:2990-3000.
Goldschmidt D., Hesse F., Worgotter F., Manoonpong P. (2012) Biologically inspired reactive climbing behavior of hexapod robots. In: Intelligent Robots and Systems (IROS), 2012 IEEE/RSJ International Conference on, pp. 4632-4637.
Hirose S. (1984) A study of design and control of a quadruped walking vehicle. The International Journal of Robotics Research 3(2):113-133.
Hutter M., Gehring C., Bloesch M., Hoepinger M., Remy C., Siegwart R. (2012) StarlETH: A compliant quadrupedal robot for fast, efficient, and versatile locomotion. In: 15th International Conference on Climbing and Walking Robot—CLAWAR 2012.
Kalakrishnan M., Buchli J., Pastor P., Mistry M., Schaal S. (2010) Learning, planning, and control for quadruped locomotion over challenging terrain. International Journal of Robotics Research 30:236-258.
Kaliyamoorthy S., Zill S. N., Quinn R. D., Ritzmann R. E., Choi J. (2001) Finite element analysis of strains in a blaberus cockroach leg during climbing. In: Intelligent Robots and Systems (IROS), 2011.
Kawato M., Furukawa K., Suzuki R. (1987) A hierarchical neural-network model for control and learning of voluntary movement. Biological Cybernetics 57:169-185.
Kovac M., Fuchs M., Guignard A., Zuerey J.-C., Floreano D. (2008) A miniature 7g jumping robot. In: Proceedings of the IEEE International Conference.
Kubow T. M., Full R. J. (1999) The role of the mechanical system in control: a hypothesis of selfstabilization in hexapedal runners. Philosophical Transactions of the Royal Society of London Series B: Biological Sciences 354(1385):849-861.
Lee W., Orin D. (1988) The kinematics of motion planning for multilegged vehicles over uneven terrain. Robotics and Automation, IEEE Journal of 4(2):204-212.
Lewinger W., Rutter B., Blume M., Buschges A., Quinn R. (2006) Sensory coupled action switching modules (SCASM) generate robust, adaptive stepping in legged robots. In: Proceedings of CLAWAR 2006, 9th International Conference on Climbing and Walking Robots.
Irawan, et al. Force Threshold-Based Omi-directional movemenet for Hexapod Robot Waling on Uneven Terrain, Computational Intelligence, Modelling and Simulation (CIMSiM), 2012 Fourth International conference, pp. 127, 132, Sep. 25-27, 2012.
Lewinger W. A., Quinn R. D. (2011) Neurobiologically based control system for an adaptively walking hexapod. Industrial Robot: An International Journal 38(3):258-263.
Liang X., Xu M., Xu L., Liu P., Ren X., Kong Z., Yang J., Zhang S. (2012) The amphihex: A novel amphibious robot with transformable leg-fipper compositepropulsion mechanism. In: Intelligent Robots and Systems (IROS), 2012 IEEE/RSJ International Conference on, pp. 3667-3672.
McMillan S., Orin D. E., McGhee R. B. (1995) DynaMechs: an object oriented software package for efficient dynamic simulation of underwater robotic vehicles. In: Yuh J. (ed) Underwater Robotic Vehicles: Design and Control, TSI Press, Albuquerque, NM, pp. 73-98.
Moore E., Campbell D., Grimminger F., Buehler M. (2002) Reliable stair climbing in the simple hexapod 'rhex'. In: Robotics and Automation, 2002. Proceedings. ICRA '02. IEEE International Conference on, pp. 2222-2227.
Murphy M. P., Saunders A., Moreira C., Rizzi A. A., Raibert M. (2011) The littledog robot. The International Journal of Robotics Research 30(2):145-149.
Neville N., Buehler M., Sharf I. (2006) A bipedal running robot with one actuator per leg. In: Proceedings of the IEEE International Conference on Robotics and Automation, pp. 848-853.
Orin D. E. (1982) Supervisory control of a multilegged robot. International Journal of Robotics Research 1(4):79-91.
Palmer III L. R., Eaton C. (2012) Toward innate leg stability on unmodeled and natural terrain: Quadruped walking. In: Proceedings of the IEEE/RSJ International Conference on Intelligent Robots and Systems.
Pongas D., Mistry M., Schaal S. (2007) A robust quadruped walking gait for traversing rough terrain. In: IEEE International Conference on Robotics and Automation, pp. 1474-1479.
Prochazka A., Gillard D., Bennett D. J. (1997) Implications of positive feedback in the control of movement. Journal of Neurophysiology 77:3237-3251.
Raibert M., Blankespoor K., Nelson G., Playter R., et al (2008) Bigdog, the rough-terrain quadruped robot. In: Proceedings of the 17th World Congress, pp. 10,823-10,825.
Rebula J., Neuhaus P., Bonnlander B., Johnson M., Pratt J. (2007) A controller for the littledog quadruped walking on rough terrain. In: IEEE International Conference on Robotics and Automation, pp. 1474-1479.
Saranli U., Buehler M., Koditschek D. (2000) Design, modeling and preliminary control of a compliant hexapod robot. In: Proceedings of the IEEE International Conference on Robotics and Automation, pp. 2589-2596.
Saranli U., Buehler M., Koditschek D. E. (2001) Rhex: A simple and highly mobile hexapod robot. The International Journal of Robotics Research 20(7):616-631.
Schroer R., Boggess M., Bachmann R., Quinn R., Ritzmann R. (2004) Comparing cockroach and whegs robot body motions. In: Robotics and Automation, 2004. Proceedings. ICRA '04. 2004 IEEE International Conference on, pp. 3288-3293.
Song S. M., Waldron K. J. (1989) Machines that Walk. MIT Press, Cambridge, MA.
Sponberg S., Spence A., Mullens C., Full R. (2011) A single muscle's multifunctional control potential of body dynamics for postural control and running. Philosophical Transactions of the Royal Society B: Biological Sciences 366:1592-1605.
Ting L. H., Blickhan R., Full R. J. (1994) Dynamic and static stability in hexapedal runners. Journal of Experimental Biology 197(1):251-269.
Vernaza P., Likhachev M., Bhattacharya S., Chitta S., Kushleyev A., Lee D. (2009) Search-based planning for a legged robot over rough terrain. In: Robotics and Automation, 2009. ICRA '09. IEEE International Conference on, pp. 2380-2387.

(56) References Cited

OTHER PUBLICATIONS

Whelan P. (1996) Control of locomotion in the decerebrate cat. Progress in Neurobiology 49:481-515.
Zill S., Keller B., Chaudhry S., Duke E., Ne D., Quinn R., Flannigan C. (2010) Detecting substrate engagement: responses of tarsal campaniform sensilla in cockroaches. Journal of Comparative Physiology A 196:407-420.

* cited by examiner

SYSTEMS AND METHODS FOR CONTROLLING WALKING ROBOTS

CROSS-REFERENCE TO RELATED APPLICATION

This application claims priority to U.S. Provisional Application Ser. No. 62/066,616, filed Oct. 21, 2014, which is hereby incorporated by reference herein in its entirety.

BACKGROUND

Legged animals can traverse significantly more of the Earth's land mass than man-made wheeled and tracked vehicles. Their impressive mobility is largely due to multiple dexterous legs and the robust algorithms that coordinate and control them. A legged animal, such as a squirrel, can exhibit multiple locomotion modes, such as walking, running, and jumping. In addition, each mode can have multiple gaits or leg phase timings. A robot that could mimic this level of robust locomotion would be highly useful for planetary exploration, military reconnaissance, and time-critical search and rescue in cluttered or collapsed buildings.

The above-described applications require a robot that can navigate uneven terrain. Unfortunately, most robots exhibit poor performance when rapidly walking over such terrain. It can therefore be appreciated that there is a need for a system and method with which a legged robot can be controlled to walk more easily over uneven terrain.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

Figure 1:
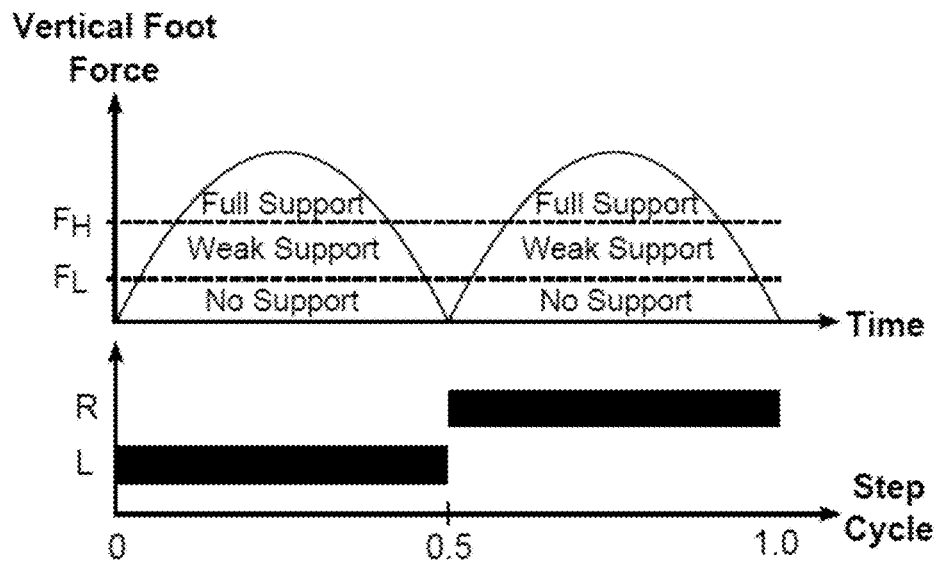
FIG. 1 shows a spring-mass model template for vertical ground reaction force. The black bars represent the stance period and white spaces the flight period.

As described above, there is a need for a system and method with which a legged robot can be controlled to walk more easily over uneven terrain. Disclosed herein are examples of such systems and methods. In some embodiments, a robot comprises multiple legs, each including a joint that is biased by a spring to a zero position. When the foot of a leg contacts the ground and applies a force to the ground, the joint moves (e.g., rotates) from the zero position against the force of the spring. The magnitude of the foot force can be determined by measuring this joint movement (e.g., angle). This force information can then be used to control operation of the leg. In some embodiments, the determined foot forces are used to maintain a threshold level of foot force to ensure that the leg will be able to propel the robot forward when called upon to do so.

In the following disclosure, various specific embodiments are described. It is to be understood that those embodiments are example implementations of the disclosed inventions and that alternative embodiments are possible. All such embodiments are intended to fall within the scope of this disclosure.

Mimicking the performance of the biological local leg controller is a goal of the work described in this disclosure. An effective local leg controller will enable legged systems to rapidly coordinate high degree-of-freedom legs by distributing the control effort, as opposed to a single controller coordinating all legs. The afferent communication from all joints, computation of the appropriate response, and efferent communication back to the joints can be burdensome for a single controller, which has led much of the research in legged locomotion toward legs with a reduced number of controllable joints at the expense of dexterity. The benefit of legged systems over wheeled vehicles is not only more effectiveness over highly irregular terrain, but also the potential for jumping, climbing, and swimming. Achieving all of these maneuvers requires legs with high dimensionality for control, and biology provides the means to rapidly coordinate these joints: the local leg controller.

A force threshold-based position (FTP) controller has been developed to operate independently on each leg with no interaction with the other leg controllers and with no inertial information about the body. The FTP controller attempts to create necessary ground reaction forces for each leg of the system such that the leg can propel and stabilize the body at every step. This is best performed when the leg achieves ground contact during each step regardless of the terrain. However, trying to assign and achieve an exact vertical force pattern for all possible scenarios during walking is nearly impossible. Also, replicating one specific force pattern for all scenarios can lead to the system becoming unstable in certain cases. Therefore, the FTP controller tries to achieve at least a minimum force magnitude at each step using specific force thresholds to control the position of each leg. This not only provides a stable walking pattern on flat terrain but also works well on irregular terrains.

For many years, position control has been used to control walking systems. Once joint angles are chosen for the leg touchdown position and the desired body motion during stance is known, the desired joint angles throughout the stance phase can be kinematically computed. A strength of position control is the inherent motion control and tilt stability that arises from well-designed trajectories. Because these trajectories are often kinematically-computed from stable and smooth body motions on well-modeled terrain, legs moving through their desired position can result in smooth body motions without the use of vestibular sensing of the body or information about the terrain. However, on complex terrain when only feed-forward trajectories dictate the desired foot position, the interaction of the foot with the ground becomes unpredictable causing sluggish forward movement and, in some cases, no forward motion is possible.

One way to alleviate this problem is to visually sense the terrain and adjust the trajectory of the leg accordingly. Another way is to change the walking pattern at each step based on the terrain height sensed by local leg feedback. The FTP controller adjusts the walking pattern by using rapid force feedback to sense the terrain. If all legs sense the terrain independently and are able to lift the body, terrain height would have very little effect on the height and tilt angles of the body. The FTP controller achieves the benefits of position control and overcomes its primary weakness by incorporating force feedback in the way of threshold comparison.

Even though every animal generates foot forces relative to its body weight, the foot force generated by each leg is different and dependent on the gait and number of legs on the ground. FIG. 1 shows a force template for the vertical ground reaction force of two steps. A leg is described to be in full support (FS) of the body when it is supporting a significant load. A leg is in no support (NS) when a small or no load is being supported, which will typically be perceived as a leg not in contact with the ground. The leg is in the weak support (WS) phase when the leg is in contact with the ground but not supporting much force. The low ($F_L$) and high ($F_H$) thresholds are used by the FTP controller to distinguish these phases and hand tuned.

For position control to work properly on irregular terrain, the trajectory of the leg should be based on the terrain height. If the ground is lower than expected, the controller must depress the foot to reach the ground and maintain the foot depression to support the body. If the ground is higher than expected, the controller must attenuate the foot depression so as not to lift the body higher than desired. Using this approach, the stance phase can be divided into a series of states dictating whether the foot should be further depressed (i.e., extended downward) or elevated (i.e., retracted upward).

The inputs to the FTP algorithm are the current foot depression and the determined foot force. The output is a depression (extension) or elevation (retraction) rate, which may be zero. The controller attempts to achieve a preferred foot depression, which can be set by the operator, while maintaining support of the body. Loss of body support should be avoided during stance because it may result in unwanted body tilt that is difficult to overcome. Foot depression/elevation is coupled with foot force and body support as described below:

1. While a foot is on the ground, further depressing this foot with respect to the body temporarily results in larger foot forces and greater support of the body. Depressing the foot too much may tilt the body away from this leg and eventually cause the foot forces to decrease.
2. Elevating a foot that is in contact with the ground temporarily reduces foot forces and body support, although continued elevation may cause the body to tilt toward this leg and result in increased forces.

By way of example, if the foot depresses past a preferred level (e.g., preferred in relation to maintaining the body of the robot in a level orientation at a desired height) as it seeks the terrain, elevating the foot back toward the preferred level immediately after contact may cause the leg to lose contact with the ground and the body to stumble. Care must be taken to elevate the foot appropriately to avoid this outcome.

Figure 2:
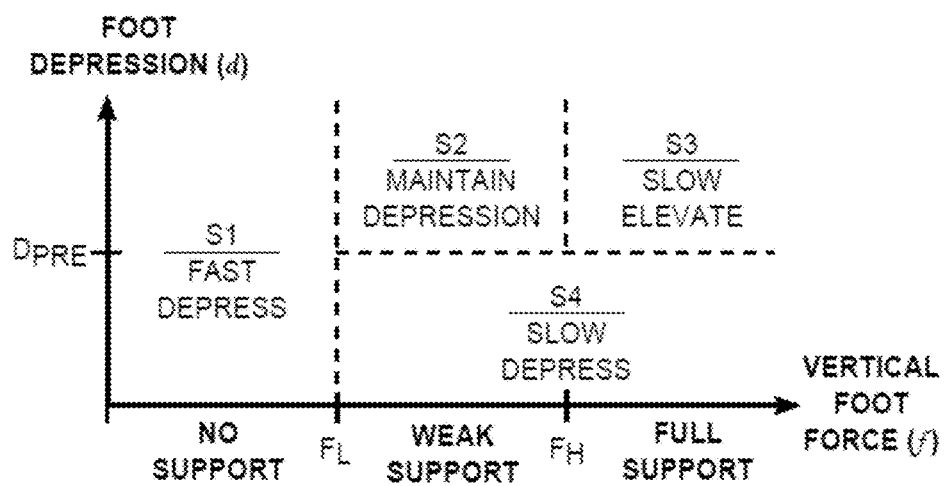
FIG. 2 shows force threshold-based position (FTP) controller states: During stance, the foot is either commanded to depress further or elevate upwards based on the measured foot force and current foot depression.

The input space for the FTP algorithm is divided into four states, shown in FIG. 2. The $F_L$ and $F_H$ thresholds correspond to the level of support currently provided by the leg (FIG. 1), and the preferred foot depression, $D_{PRE}$, is the level at which the body walks at a user-selected height. If all stance legs achieve $D_{PRE}$, the body will be level on the pitch and roll axes, as is true with a simple position controller. The states shown in FIG. 2 are explained below:

S1: The leg enters S1 at the start of the stance phase, and the foot is directed to fast depress toward the terrain at a constant rate $\Delta_{FD}$. If ground contact is lost at any point during the stance phase, which is perceived by the foot force decreasing below $F_L$, the leg re-enters state S1 and is depressed rapidly in order to re-engage the terrain.

S2: In this state, the foot depression remains unchanged because the foot is depressed farther than preferred, but the leg is weakly supporting the body. Elevating the foot in this situation may cause the leg to lift off the ground and the body to tilt inappropriately.

S3: When the leg is in full support of the body, the foot can be elevated slowly toward $D_{PRE}$ if needed. The rate of elevation ($\Delta_{SE}$) must be limited such that the algorithm can rapidly stop this elevation when the foot force drops below $F_H$ and the leg is in danger of losing support of the body.

S4: In this state, the foot is depressed slowly toward $D_{PRE}$ at a constant rate $\Delta_{SD}$. If the leg is in weak support, the depression should increase the foot force and result in greater support of the body as desired.

Figure 3A:
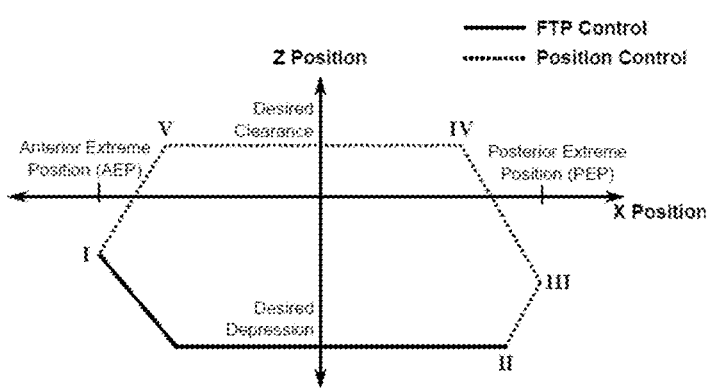
FIGS. 3A and 3B show cyclic walking behavior using an FTP algorithm: (A) Position of foot in the X and Z plane (foot position in Y plane is kept constant) during a step: The behavior is governed by five position variables which determine the extreme positions of the foot in the X and Z plane. (B) Timing cycle in the X and Z plane: The FTP controller controls the leg during the stance phase while the position controller swings the leg back to its original position.
Figure 3B:
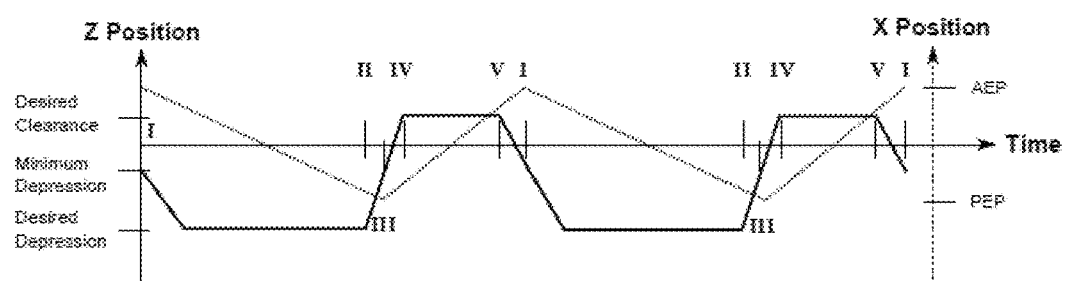

FIG. 3 shows the cyclic behavior used by the FTP algorithm for walking on uneven terrain. FIG. 3A shows the position of the foot with respect to the leg attachment to the body in the X and Z plane. On flat terrain, the position plot is similar from step to step but, on uneven terrain, based on the force feedback, foot depression changes from step to step in order to match the terrain. FIG. 3B shows the desired X and Z foot positions with respect to time. The stance duty factor ($0<D_S<1$) controls the ratio of time between the stance and swing phase during a single step. The retraction duty factor ($0<D_R<1$) controls the ratio of time between the retract and protract phase during a single step. $D_R$ is chosen to be greater than $D_S$ in order to delay protraction until the foot has been elevated from the terrain. For the experiments described below, $D_R$ and $D_S$ were selected to be 0.8 and 0.7 respectively. The time duration for a single step was kept constant for all legs. Thus, even though all the legs were independently controlled, starting the execution of the FTP controller on the legs at the same time made them synchronous with each other. By using appropriate phase shift, the gait of the robot can be controlled.

Figure 4:
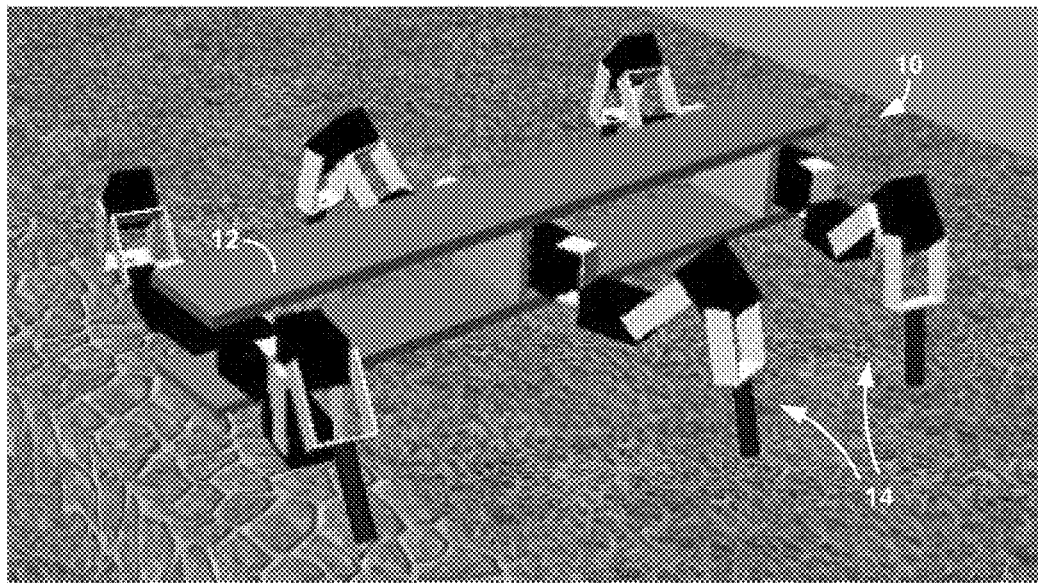
FIG. 4 is a perspective view of an embodiment of a walking robot.

FIG. 4 is a rendering of an example embodiment of a walking robot 10 that is designed to traverse uneven terrain. As shown in this figure, the robot 10 generally comprises a body 12 from which multiple legs 14 extend. In the illustrated embodiment, the robot 10 is configured as a hexapod that comprises six hexapod legs 14.

One of the main criteria for a hexapod leg design is the need to accurately measure the foot forces at a high rate. This is needed so that the FTP algorithm can respond quickly to the change in terrain while achieving the maximum possible forward movement in a single stride. The accuracy of the foot force data is crucial to the success of the FTP algorithm.

Figure 5:
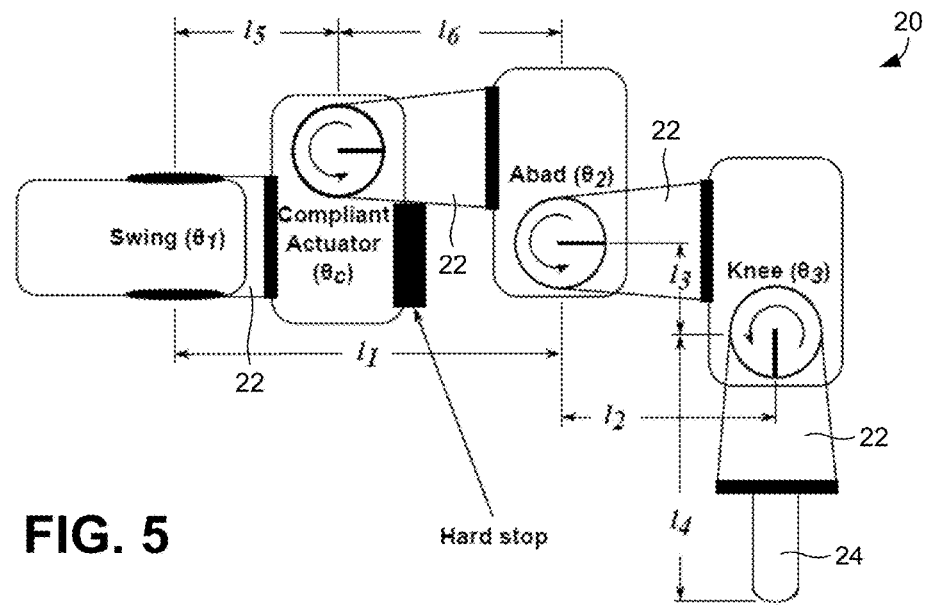
FIG. 5 is a side view of an embodiment of a leg that can be used on a walking robot such as that illustrated in FIG. 4.

In some embodiments, the hexapod leg is modeled after the legs of a stick insect and has four degrees of freedom on each leg. FIG. 5 illustrates an embodiment of such a leg 20. The leg 20 comprises multiple leg segments 22 that are joined my multiple joints. In the illustrated embodiment, the leg 20 comprises four leg segments 22 and the joints connecting them include a first or swing joint $\theta_1$, a second or abad joint $\theta_2$, and a third or knee joint $\theta_3$. Each of these joints comprises a motorized actuator that can be used to control the position of a foot 24 of the leg 20. The swing joint $\theta_1$ has a generally vertical (Z direction) axis and controls the fore-aft motion of the leg 20 while the abad joint $\theta_2$ and the knee joint $\theta_3$ have generally horizontal (X direction) axes and control the foot elevation and depression. As is further shown in FIG. 5, the leg 20 also comprises a compliant actuator $\theta_c$. The compliant actuator $\theta_c$ forms a further joint of the leg 20 and can be used to detect foot forces.

Some actuators in the market use a position controller with selectable gain to determine the output torque of the actuator. The compliance of the actuator can be used to measure the corresponding load by reading its position and determining the error. This is achieved by setting the proportional gain low, making the actuator compliant enough to deviate from the zero position when a load is applied. These small position changes can be monitored to find the corresponding load on the actuator. Since the output torque grows as the position deviates from the zero position, one can estimate the force on the actuator.

Figure 6:
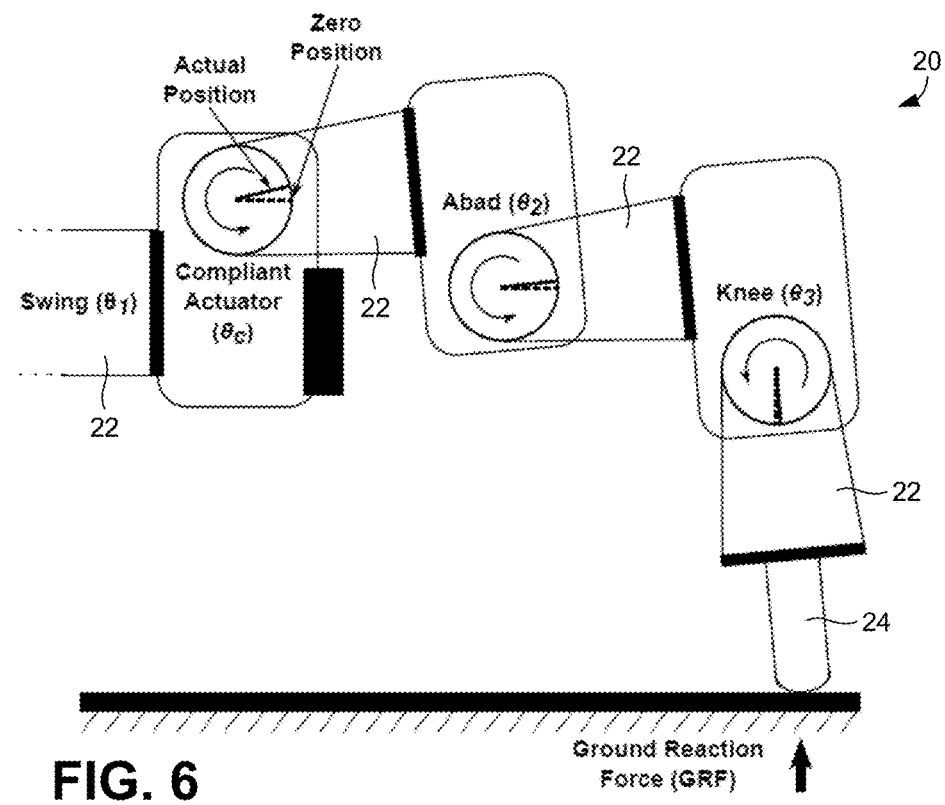
FIG. 6 is a side view of the leg of FIG. 5 illustrating a compliant actuator of the detecting foot forces imparted to a foot of the leg by the ground.

The compliant actuator $\theta_c$ is positioned between the swing joint $\theta_1$ and the abad joint $\theta_2$ and is used to detect the foot force in the Z direction. Since the compliant actuator $\theta_c$ is used to find foot forces during foot touchdown, a hard stop has been placed such that the actuator does not move past the zero position in the clockwise direction during flight (see FIG. 5). The compliant actuator $\theta_c$ is commanded to hold the zero position. When the foot 24 touches the ground, the force and body weight of the hexapod cause the compliant actuator $\theta_c$ to deviate from this position. FIG. 6 shows this scenario in the counter-clockwise direction. The change in the actuator position can be read and ground contact can be inferred. It is noted that there is some compliance in all the swing joint $\theta_1$, abad joint $\theta_2$, and knee joint $\theta_3$ joints, but they are much stiffer than the compliant actuator $\theta_c$.

Figure 7:
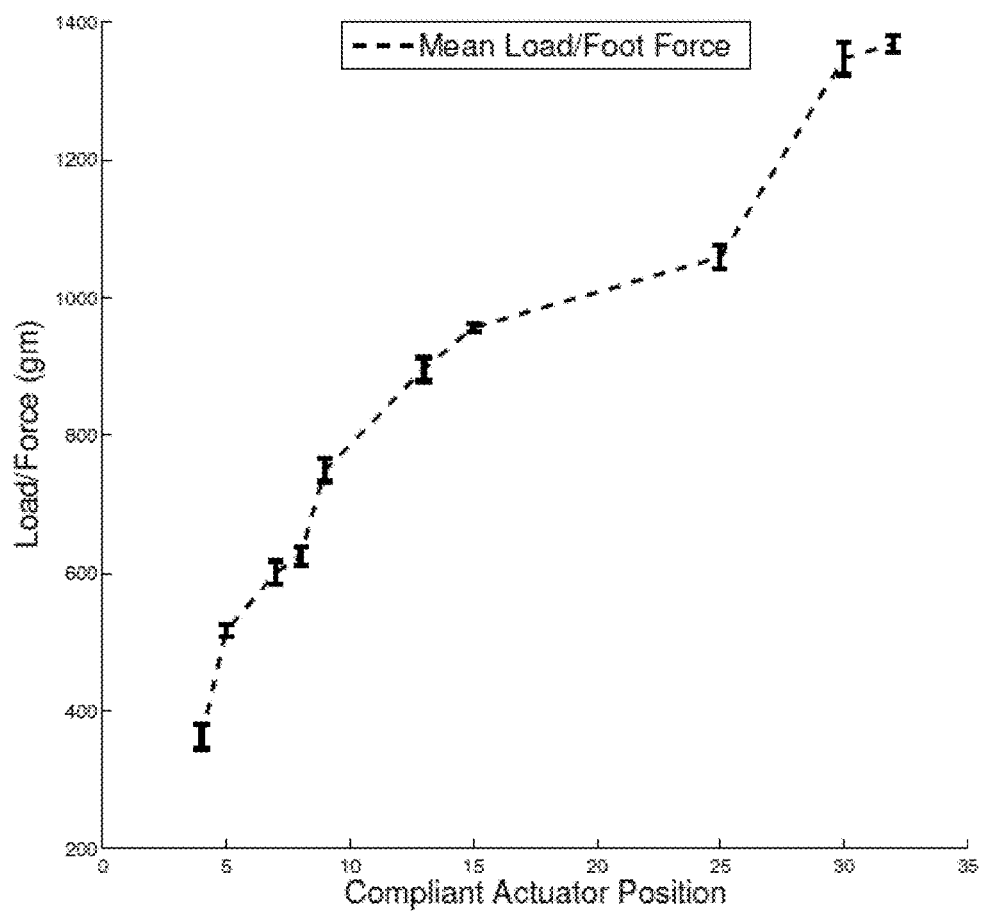
FIG. 7 is a graph that shows the relationship between load and compliance: Measured load corresponding to compliant actuator position.

The relationship between compliance of the actuator and load can be evaluated by using a weighing scale to note the load at the foot corresponding to the position deviation of the compliant actuator. FIG. 7 shows the load corresponding to the compliant actuator position. For this experiment, a tripod was made to carry the weight of the hexapod and the depression of each tripod leg was increased. Additional weights were added to the hexapod to find the load corresponding to the higher position deviations. Each experiment was performed multiple times and the mean load was calculated. The figure shows the mean and standard deviation of the load corresponding to the compliant actuator position. The change in the actuator position has an almost linear relationship to the load experienced by the leg. The compliant actuator position is also used in the forward kinematic calculation of the desired joint angles from the commanded foot depression level.

Figure 8:
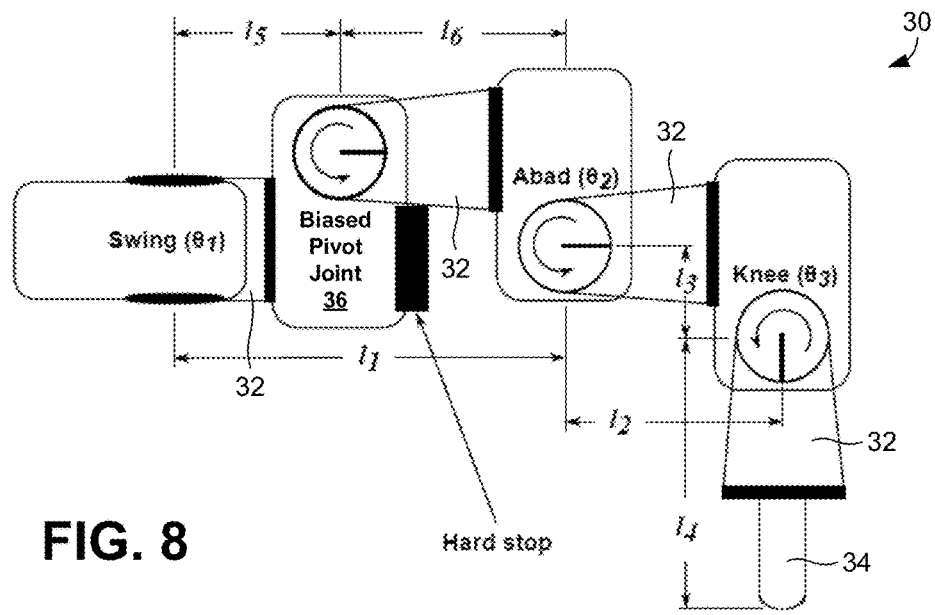
FIG. 8 is a side view of a further embodiment of a leg that can be used on a walking robot such as that illustrated in FIG. 4.

In alternative embodiments, the foot force can be determined based upon displacement of a biased joint, such as a hip joint near the point at which the leg attaches to the body of the robot. For example, the compliant actuator $\theta_c$ shown in FIGS. 5 and 6 can be replaced with a simple pivot joint that is biased toward the zero position with a spring (or other biasing element) having a known spring constant. FIG. 8 shows an example of such an embodiment. As shown in this figure, the leg 30 is similar in many ways to the leg 20. Accordingly, the leg 30 comprises multiple leg segments 32 that are joined my multiple joints, including a first or swing joint $\theta_1$, a second or abad joint $\theta_2$, and a third or knee joint $\theta_3$. Each of these joints comprises a motorized actuator that can be used to control the position of a foot 34 of the leg 30. Instead of further comprising a compliant actuator, however, the leg 30 includes a simple biased pivot joint 36. The pivot joint 36 is biased by a biasing element, such as a spring, that urges the joint toward the zero position. When the joint 36 is rotated because of contact between the foot 34 and the ground, however, the biasing element is compressed (or extended) and the angle through which the joint rotates can be detected using an appropriate sensor.

Figure 9A:
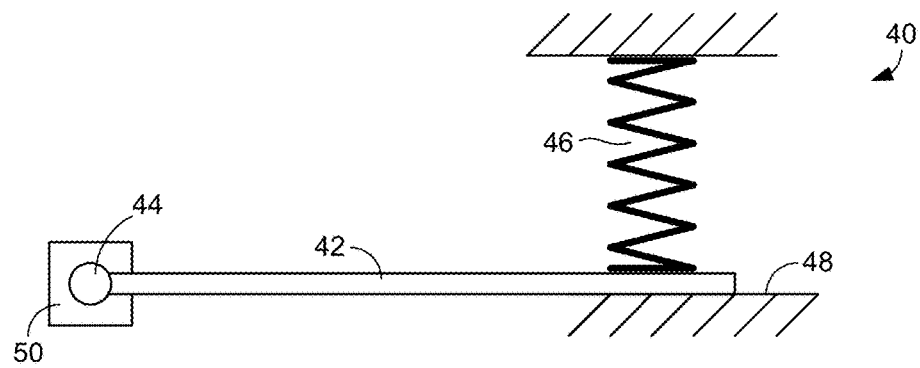
FIGS. 9A and 9B are schematic views of a biased simple biased pivot joint that can be provided in a leg of a walking robot to determine foot force.
Figure 9B:
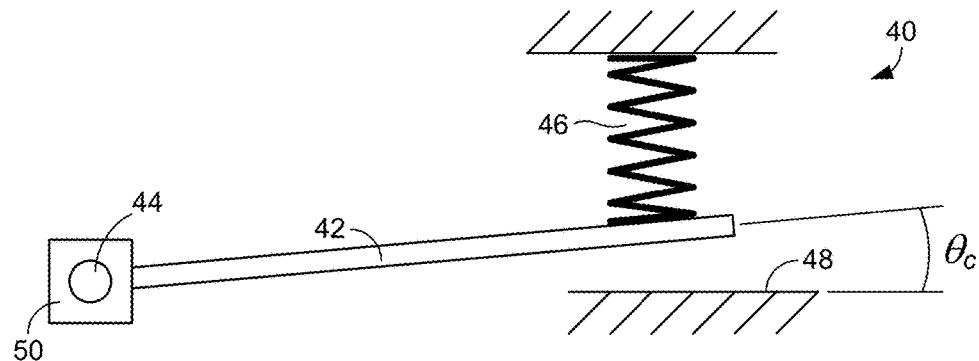

FIGS. 9A and 9B schematically illustrate a biased pivot joint 40 and its operation. As shown in these figures, a leg segment 42 has a pivot point or axis 44 about which it can pivot or rotate. A biasing element, in the form of a compression spring 46, urges the leg segment 42 toward a hard stop 48, which is located at the zero angular position. The leg segment 42 is shown in this position in FIG. 9A. When the leg segment 42 rotates due to interaction between the ground and the foot of the leg, the leg segment 42 is pivoted away from the stop 48 to a given angle $\theta_c$, as shown in FIG. 9B. The magnitude of this angle can be detected using an angular position sensor 50. While a particular configuration, has been illustrated in FIGS. 9A and 9B, it is to be understood that these figures are intended to illustrate the joint 40 in a conceptual manner and are not intended to limit the joint to a particular structural arrangement.

As with the embodiment of FIGS. 5 and 6, foot force can be determined from the measured angular displacement of the leg 30. The leg can pivot about the axis of the joint away from the zero position (e.g., counter-clockwise in the orientation of FIG. 8) against the force of the spring in response to a force that is applied to the foot. Because the spring constant is known, the angle $\theta_c$ that the leg forms at the joint 36, measured by the angular position sensor, can be used to calculate the foot force in real time.

Figure 10:
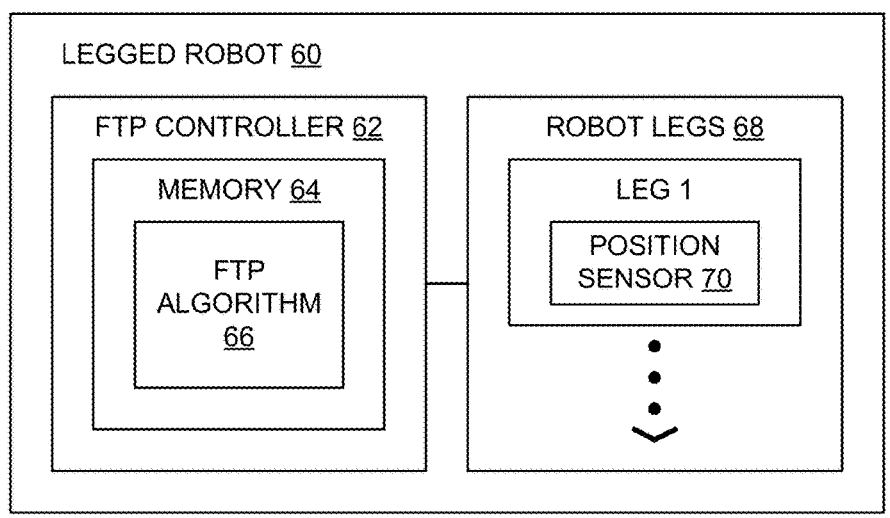
FIG. 10 is a block diagram illustrating an example control system for a walking robot.

FIG. 10 illustrates an example embodiment of a legged robot 60 that is controlled by an FTP controller 62. As shown in the figure, the FTP controller 62 comprises memory 64 (i.e., a non-transitory computer-readable medium) that stores an FTP algorithm 66 (i.e., logic) that is used to control operation of the various legs 68 of the robot 60. Using the FTP algorithm 66, the FTP controller 62 individually controls each leg 68 using feedback collected by each individual leg. More particularly, the FTP controller 62 attempts to achieve at least a minimum ground reaction force for leg 68 at each step it takes using force feedback collected by the angular position sensor 70 of each individual leg.

Figure 11:
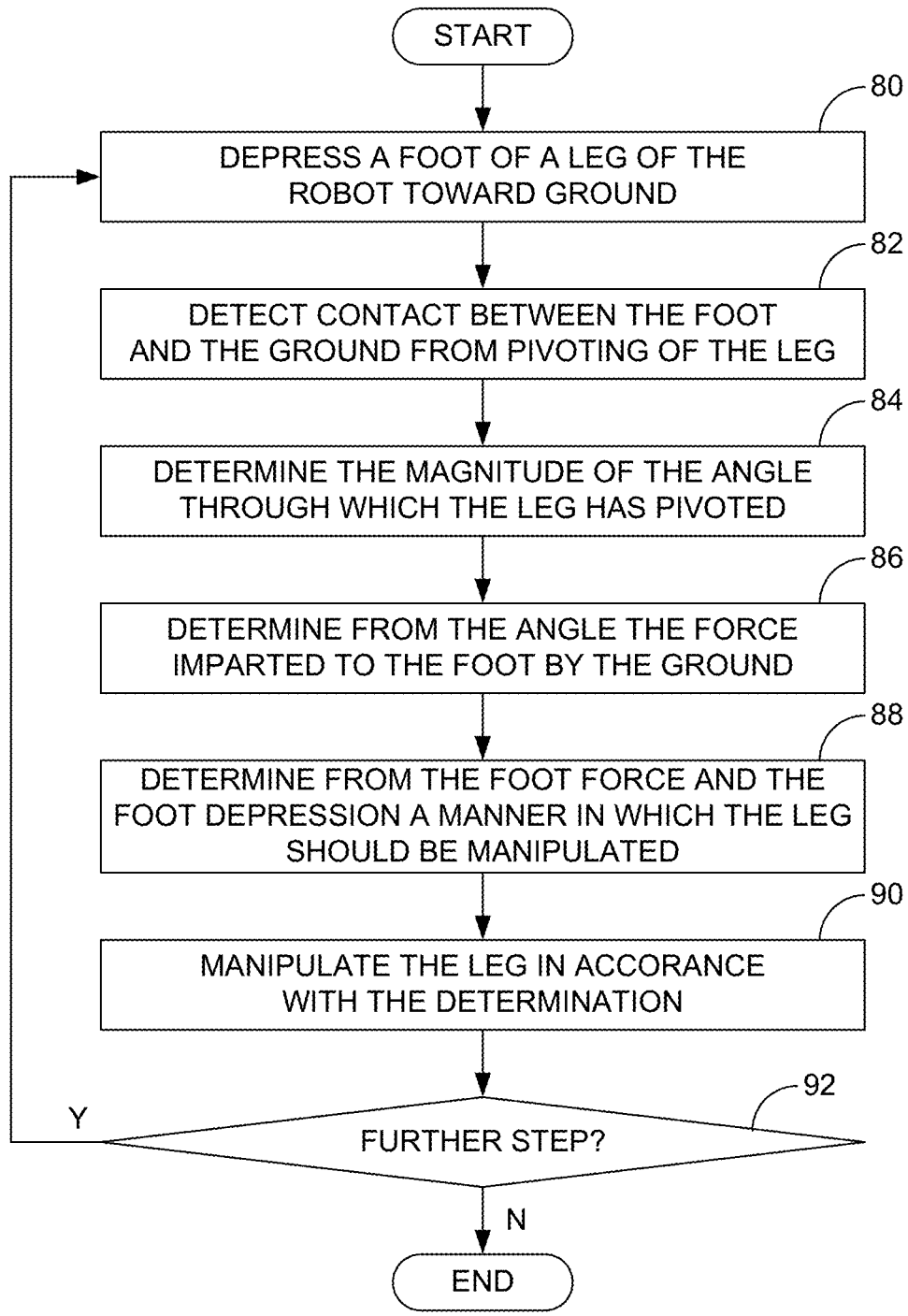
FIG. 11 is a flow diagram of an embodiment for controlling a leg of a walking robot.

FIG. 11 is a flow diagram that illustrates an embodiment of a method for controlling a legged robot using the FTP controller 62. More particularly, FIG. 11 shows control exercised on each individual leg by the FTP controller 62. This control can be exercised for each step taken by each individual leg. Beginning with block 80 of this figure, the foot of the leg is depressed (extended) downward toward the ground. Once contact is made between the foot and the ground, this contact is detected from pivoting of the leg, as indicated in block 82. As described above, the pivoting can be detected by an angular position sensor associated with a joint of the leg near its hip (i.e., attachment point to the body of the robot). Because of this sensor, the magnitude of the angle through which the leg pivots can be determined, as indicated in block 84. From this magnitude, the FTP controller 62 can determine the force that is being imparted to the foot by the ground (i.e., the ground reaction force), as indicated in block 86.

Once the foot force and the foot depression are known, the FTP controller 62 can then determine from the foot force and the foot depression the manner in which the leg should be manipulated (block 88) to achieve a minimum ground reaction force that enables the leg to best propel and stabilize the robot. In some embodiments, the FTP controller 62 can determine a depression or elevation rate that should be used to achieve the minimum ground reaction force and work toward the preferred foot depression. With reference to block 90, the leg can then be manipulated according to the determination made in block 88.

At this point, flow depends upon whether or not a further step is to be taken. If so, flow returns to block 80 and the method described above is repeated for the next step. If not, flow is terminated.

An experimental hexapod, the HexaBull-1, similar in design to the robot shown in FIG. 4 was used to test the FTP controller. The hexapod used a foot force measurement scheme similar to that described in relation to FIGS. 5 and 6 above. The dimensions of the hexapod system are given in Table 1. The swing joint $\theta_1$ was controlled using a Dynamixel RX-28 (Robotis Inc.) servo actuator, while the joints abad joint $\theta_2$, knee joint $\theta_3$, and the compliant joint $\theta_c$ were controlled using a Dynamixel AX-18A (Robotis Inc.) servo actuator. Based on the leg structure (FIG. 5) and link lengths (Table 1), each leg could achieve a foot clearance of 4 cm during the swing phase and a maximum foot depression of 16 cm during the stance phase.

TABLE 1

Hexapod Dimensions

| Attribute: | Length (cm) |
| --- | --- |
| Body Length | 52.1 |
| Body Width | 10.5 |
| Body Depth | 6.1 |
| Leg: Link Length 1 ($l_1$) | 9.3 |
| Leg: Link Length 2 ($l_2$) | 7.1 |
| Leg: Link Length 3 ($l_3$) | 2.4 |
| Leg: Link Length 4 ($l_4$) | 9.2 |

A CM-700 control board (Robotis Inc.) was used to control each contralateral pair of hexapod legs through serial communication with each joint servo. The control board used the ATMega2561 8-bit microcontroller running at 16 MHz and had 8 KB of flash program memory. Three CM-700 boards were used to control the hexapod and were completely separated except for the power supply. The same code was loaded into the three boards and the leg control algorithm started as the boards were powered on. The controller frequency was 40 Hz for the experiments.

Simulation of the FTP algorithm was performed using the RobotBuilder simulation environment, which is built upon the DynaMechs (McMillan et al, 1995) software package. System losses were modeled as damping in the compliant ground. Ground spring and damping coefficients were 75 kN/m and 2 kN/m/s, respectively. Ground static and kinetic friction coefficients were 0.75 and 0.6 respectively, matching the properties of rubber on concrete. Each leg link was modeled as a 0.1 kg slim rod with a geometrically-centered mass. The simulated hexapod was modeled similarly to the experimental hexapod, however no compliant actuator was simulated. Joint torque multiplied through a Jacobian is used to compute the foot force.

Figure 12:
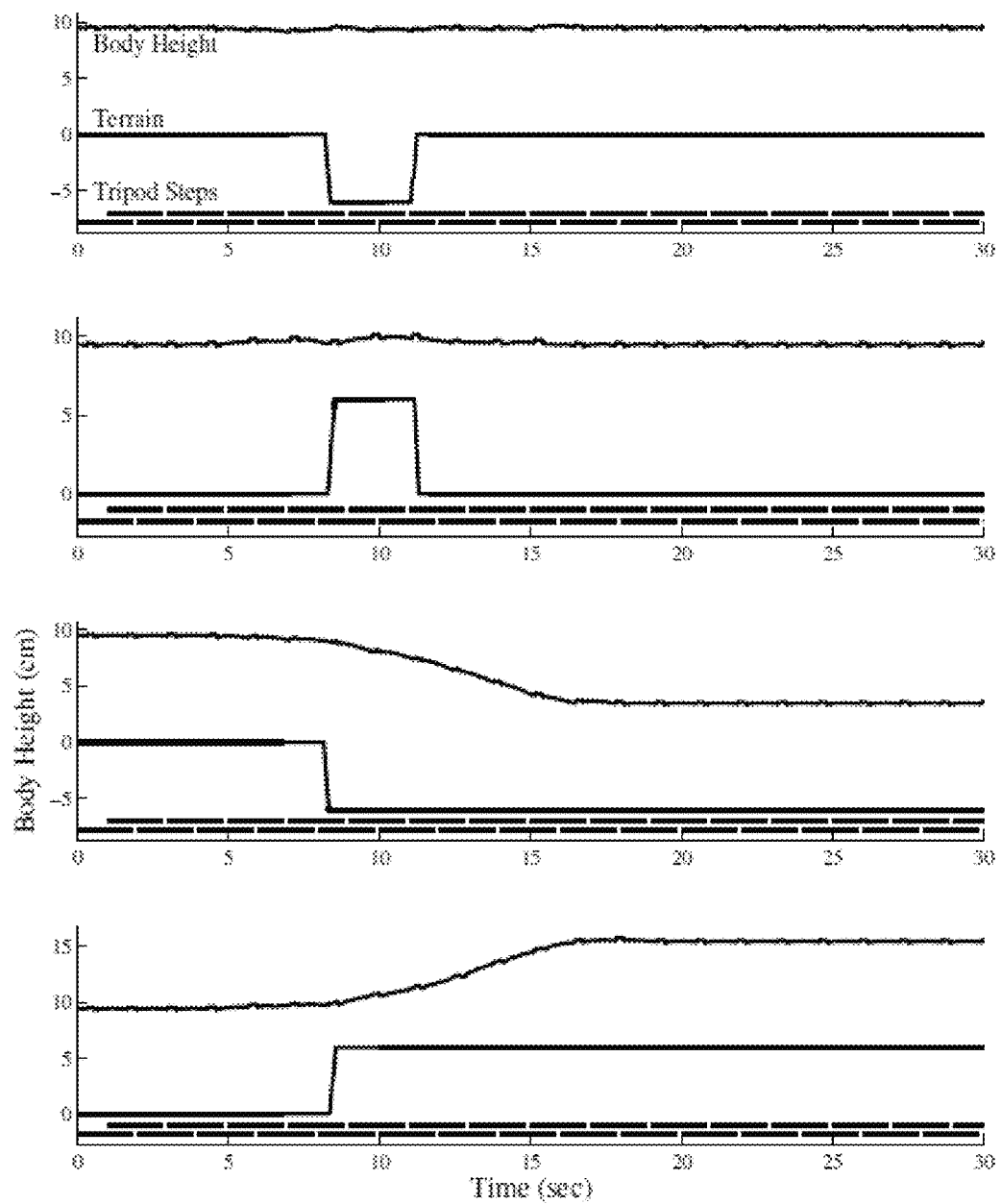
FIG. 12 shows the body height of the hexapod walking on different terrains in simulation.

FIG. 12 shows the body height of the hexapod walking over different terrains in simulation using the alternating tripod gait. Four different simulation environments were created for testing the algorithm. Terrain A contained a gap of height 2.5 cm (first subplots of FIG. 12). All of the legs of the hexapod had to negotiate the obstacle. Terrain B contained an obstacle of height 2.5 cm (FIG. 12). The width of the obstacle (or gap) in Terrain B (or A) was 17 cm such that only one pair of contralateral legs were on the obstacle. Terrain C contained a step of height 2.5 cm, which decreased the height of the terrain and the terrain remained at that height (third subplots of FIG. 8). Terrain D contained a step of size 2.5 cm, which raised the height of the terrain. Similar testing environments were created for the experimental hexapod using wooden planks and blocks. Terrains A to D were built with obstacle and steps of a height of 6.35 cm and gaps of a height of 10.16 cm.

In FIG. 12, the body height is measured from the geometric center of the hexapod to the terrain. The bottom of each subplot also shows the stepping pattern for both left and right tripods of the hexapod. The black bar represents the stance period. In the first two subplots, the body height of the hexapod remains fairly stable as each set of contralateral legs passes over the gap or the obstacle. In the latter two subplots, once the hexapod passes over the step up or down, each leg works toward the preferred foot depression $D_{PRE}$. After several steps, the body height returns to its original walking height with respect to the ground. This is the benefit of FTP algorithm continuing to run during the stance phase. If the depression remains constant after ground contact, the body height would not return to normal.

The rate of slow depression $\Delta_{SD}$ and slow elevation $\Delta_{SE}$ dictates the number of steps needed by the hexapod to reach $D_{PRE}$ which, in effect, controls the body height. The alternating tripod gait was used by the hexapod in the remaining experiments as well. The $\Delta_{SD}$ rate for this experiment was $0:01*\Delta_{FD}$ while the $\Delta_{SE}$ was $0:015*\Delta_{FD}$ where the $\Delta_{FD}$ is 0.4 mm per control step. The control step in the simulation was 1 ms (frequency 1 KHz). The same rates were used for other simulation experiments unless stated.

Figure 13:
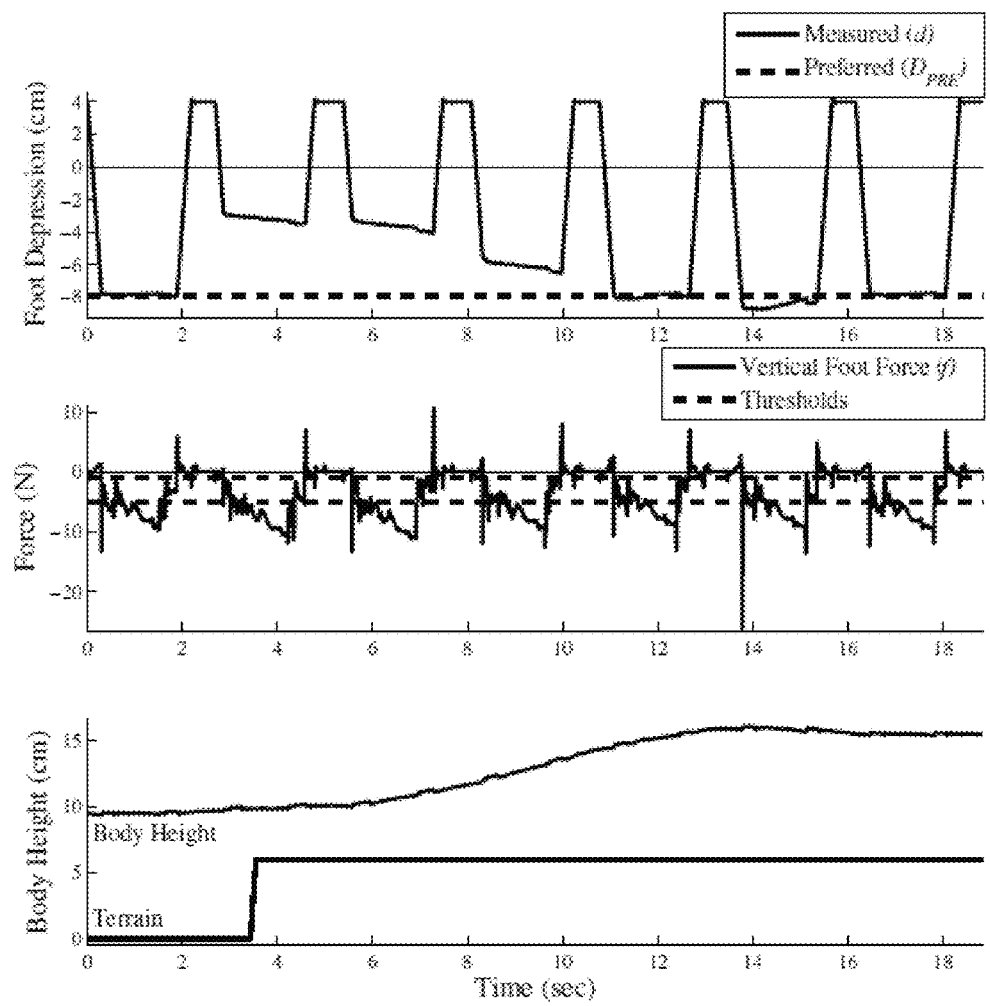
FIG. 13 shows data for walking over a step: Foot depression and foot force of the front right leg with body height as the hexapod climbs over a step in simulation.

FIG. 13 shows the foot depression and foot force of the front right leg with the body height as the hexapod walked on Terrain D in simulation. At each step, the leg entered the S1 state and depressed the foot at a constant rate ($\Delta_{FD}$) until the foot touched down. At 2.8 sec, the leg contacted the ground earlier than expected and entered the S4 state to slowly depress the foot. The foot depression did not reach $D_{PRE}$ but lifted the body. The same thing happened during steps 3, 4, and 5, and the foot depression increased at each step until it reached $D_{PRE}$ and the body height reached its original walking height. After step 5, the front right leg returned to normal cyclic pattern and the body height remained consistent as it walked over the flat terrain. The behavior shown in FIG. 13 can be verified using the FTP controller states in FIG. 2.

Figure 14:
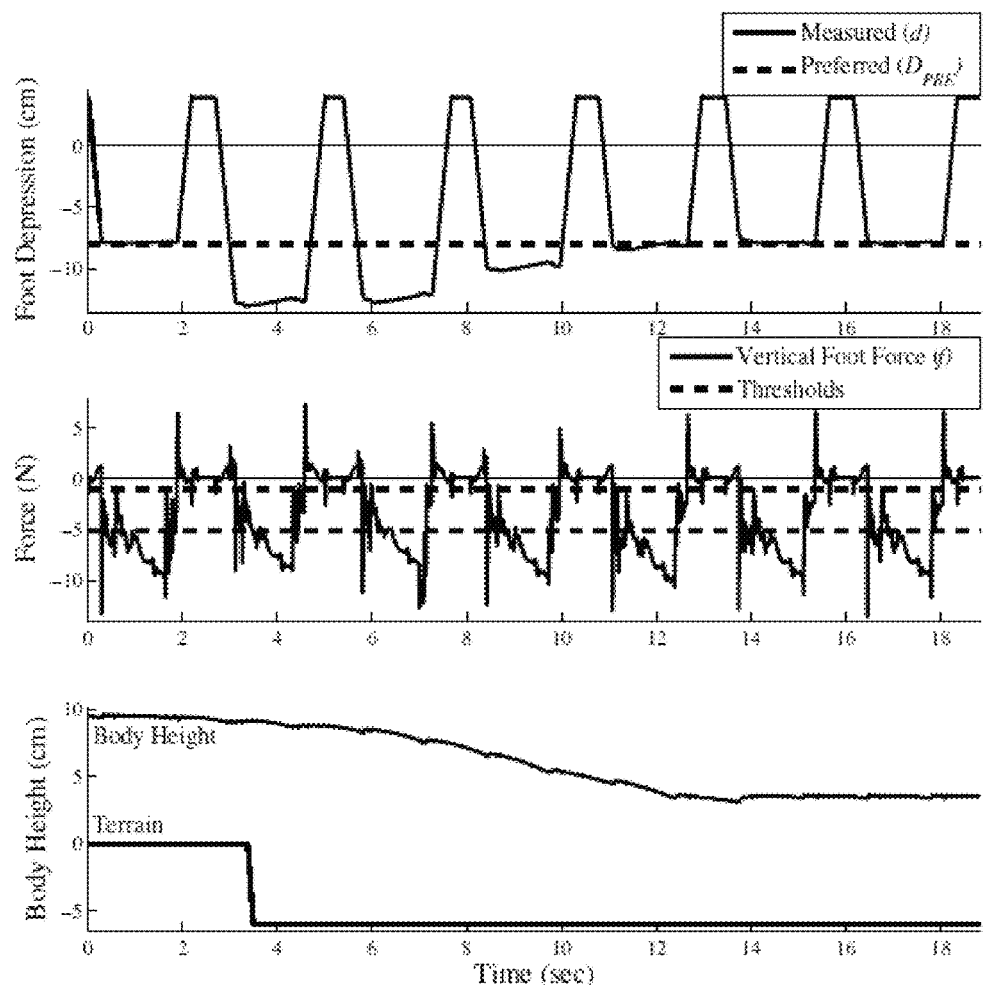
FIG. 14 shows data for walking down a step: Foot depression and foot force of the front right leg with body height as the hexapod walks down a step in simulation.

FIG. 14 shows the foot depression and foot force of the front right leg with body height as the hexapod walked on Terrain C in simulation. As the hexapod walked down the step, each leg achieved ground contact using $\Delta_{FD}$. Similar to FIG. 13, the leg length worked toward the preferred foot depression $D_{PRE}$, which brought the body back to its original walking height. FIGS. 13 and 14 show how the states S3 and S4 helped the hexapod regain the preferred foot depression $D_{PRE}$. The hexapod regained the preferred foot depression $D_{PRE}$ after three steps in these figures.

Figure 15:
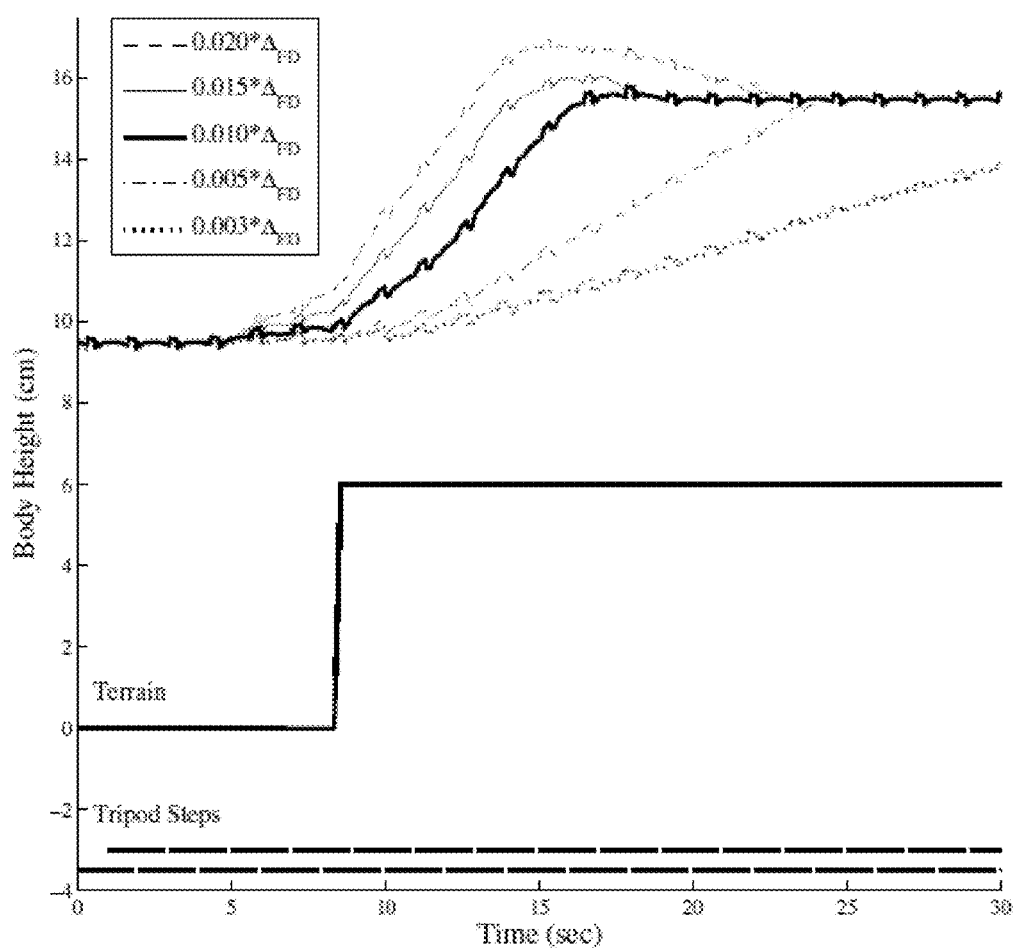
FIG. 15 shows the effect of slow foot depression: Body height of the hexapod as it climbs over a step using different $\Delta_{SD}$ in simulation. The figure shows the time taken by the hexapod to regain the desired body height.

FIG. 15 shows the body height of the hexapod as it walked on Terrain D in simulation using multiple slow depression ($\Delta_{SD}$) rates. As can been seen in this figure, the time (or number of steps) for the body height to return to the original height depended on the rate. The $\Delta_{SD}$=$0.010*\Delta_{FD}$ works well for the simulated terrains described herein. As the step size is increased, higher rates are needed for the body height to return to normal in a reasonable number of steps.

Figure 16:
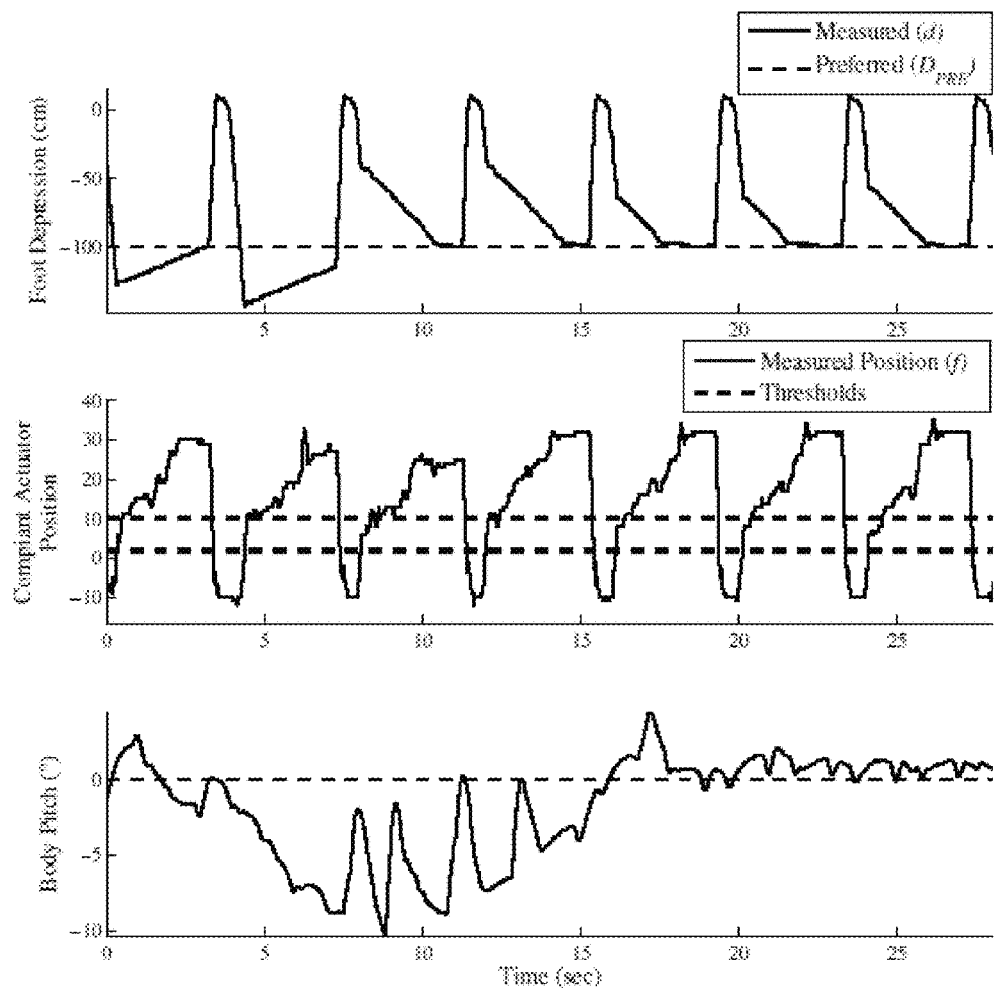
FIG. 16 shows data for step down: Foot depression and compliant actuator position of the front right leg along with the body pitch as the experimental hexapod walks down a step.

FIG. 16 shows the foot depression, the compliant actuator position of the front right leg, and the body pitch as the experimental hexapod walked on Terrain C with a step of height 10.16 cm. The body pitch of the hexapod was determined using a SCA121T dual-axis inclinometer, which was configured to record the body pitch of the hexapod. The inclinometer data was not used by the FTP algorithm. The first step taken by the leg was down the step. The leg entered the S1 state and depressed the foot at a constant rate ($\Delta_{FD}$). After foot touchdown, the leg entered the S3 state and elevated the foot using $\Delta_{SD}$. This happened for another step as the hexapod walked down the step. After some steps, the body height and body pitch of the hexapod reached the original level. As can be seen in FIG. 16, the compliant actuator position has a very similar shape when compared with the foot forces in simulation (FIG. 14), validating the use of a compliant actuator for recording foot forces. The $\Delta_{SD}$ rate for this experiment was $0.08*\Delta_{FD}$, while the $\Delta_{SE}$ was $0.03*\Delta_{FD}$, where the $\Delta_{FD}$ was 1 cm per control step. The control step on the experimental hardware was 25 ms (frequency 40 Hz). The same rates have been used for other hardware experiments unless stated.

Figure 17:
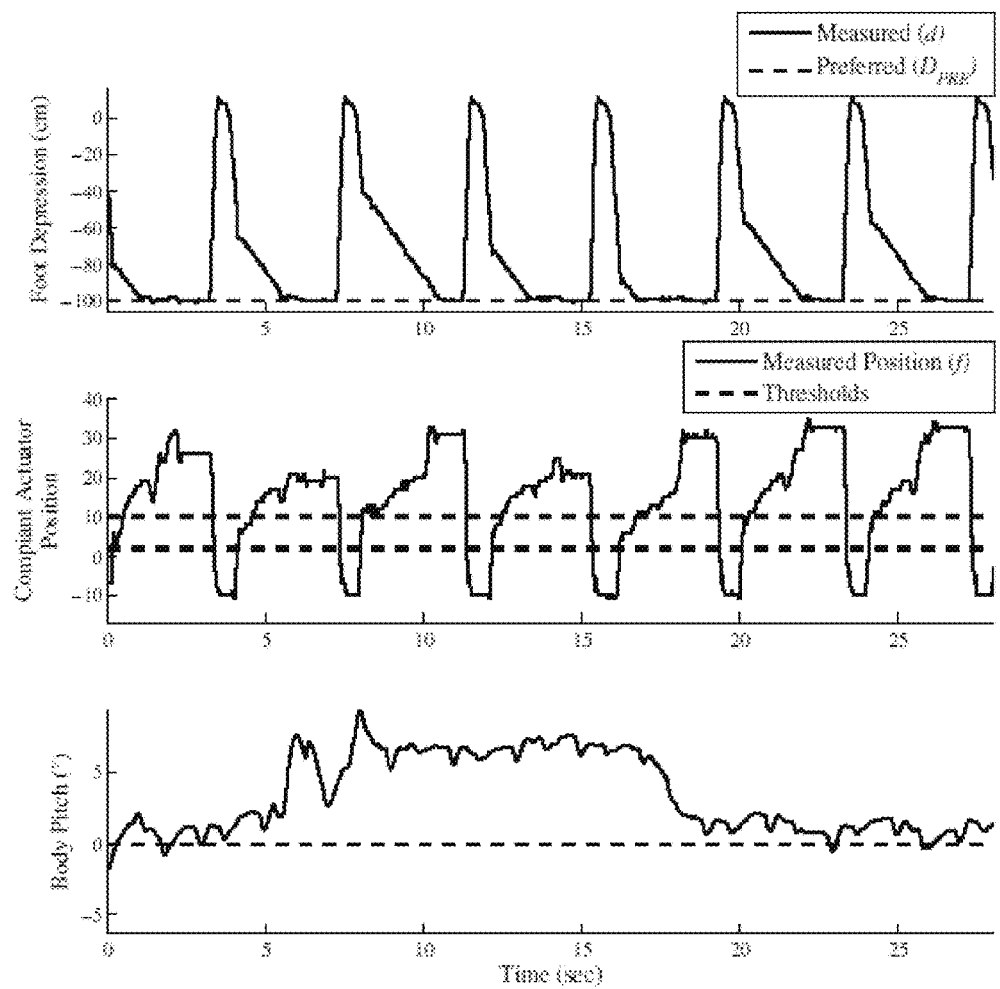
FIG. 17 shows data for step up: Foot depression and compliant actuator position of the front right leg along with the body pitch as the experimental hexapod climbs over a step.

FIG. 17 shows the foot depression, the compliant actuator position of the front right leg, and the body pitch as the experimental hexapod walked on Terrain D with a step of height 6.35 cm. The leg took two steps before reaching the step on the terrain. The body pitch of the hexapod reached the same level after several steps.

Comparing FIG. 13 with FIGS. 13 and 14, it can be seen that the A values used in simulation are much different than the ones used with the experimental hexapod, especially $\Delta_{SD}$. One of the reasons for the higher values is slippage. The feet on the experimental hexapod slip while walking, causing the body height to dip down. A higher $\Delta_{SD}$ is needed to lift the body higher after touchdown to compensate for this slippage and to increase the overall body height. This can be observed in FIG. 17. After the body pitch returns to normal, the hexapod leg touches down earlier than expected in the next few steps. So larger $\Delta_{SD}$ is required for the experimental hexapod to maintain its body height.

Figure 18:
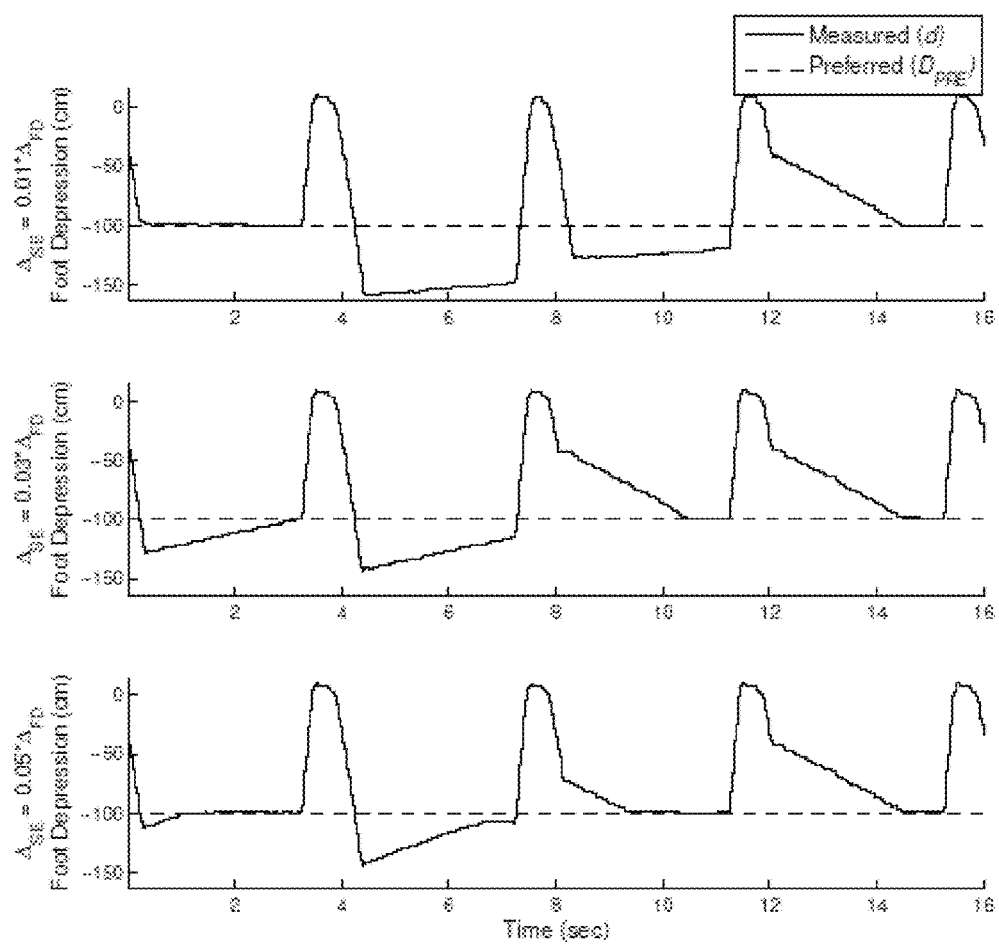
FIG. 18 shows the effect of slow foot elevation: Foot depression of the front right leg of the experimental hexapod as it walks down a step using three different $\Delta_{SE}$.

FIG. 18 shows the effect of using different $\Delta_{SE}$ as the experimental hexapod walked on Terrain C. As can be seen, the legs returned to the normal stepping pattern faster when larger $\Delta_{SE}$ is used. The $\Delta_{SE}$=$0.03*\Delta_{FD}$ works well for hardware terrains described herein.

The invention claimed is:

1. A method for controlling a walking robot, the method comprising:
   providing a walking robot having multiple legs, each leg including a pivot joint having an initial zero position, a foot adapted to contact a ground surface, and an angular position sensor associated with the pivot joint;
   the angular position sensors individually measuring for each leg a current pivot angle for the leg;
   individually determining for each leg from the measured pivot angles a current magnitude of foot force;
   individually determining for each leg a current magnitude of foot depression; and
   individually determining for each leg how to manipulate the leg depending upon the determined foot force and foot depression magnitudes.

2. The method of claim 1, wherein individually determining for each leg from the measured pivot angles a current magnitude of foot force comprises calculating the foot force based upon the measured angle and a spring constant of a spring that opposes pivoting of the pivot joint.

3. The method of claim 1, wherein individually determining for each leg of the robot how to manipulate the leg comprises determining for each leg how to elevate or depress the foot to maintain a minimum level of foot force necessary to stabilize the robot.

4. A control apparatus for controlling a walking robot, the control apparatus comprising:
   angular position sensors configured to measure pivot angles through which legs of the walking robot pivot;
   a force threshold-based position (FTP) controller for controlling the legs of the walking robot, the controller comprising a non-transitory computer-readable medium that stores an FTP algorithm configured to:
   receive from the angular position sensors pivot angles measured for the legs;
   individually determine for each leg from the measured pivot angles a current magnitude of foot force,
   individually determine for each leg a current magnitude of foot depression, and
   individually determine for each leg of the robot how to manipulate the leg depending upon the determined foot force and foot depression magnitudes.

5. The controller of claim 4, wherein individually determining for each leg from the measured pivot angles the current magnitude of foot force comprises calculating the foot force based upon the measured angle and a spring constant of a spring that opposes pivoting of the pivot joint.

6. The controller of claim 4, wherein individually determining for each leg of the robot how to manipulate the leg comprises determining for each leg how to elevate or depress the foot to maintain at least a minimum level of foot force necessary to stabilize the robot.

7. A walking robot comprising:
a robot body;
multiple legs attached to and extending from the body, at least one leg including a pivot joint having an initial zero position and a foot that is adapted to contact a ground surface, wherein force applied to the foot because of contact with the ground causes the at least one leg to pivot about the pivot joint;
an angular position sensor associated with the pivot joint and configured to measure a pivot angle through which the at least one leg has pivoted about the pivot joint, the angle being related to the force applied to the foot; and
a force threshold-based position (FTP) controller configured to determine the force applied to the foot using the measured pivot angle.

8. The robot of claim 7, wherein each leg includes a pivot joint and an angular position sensor configured to measure an angle through which the leg has pivoted about the pivot joint.

9. The robot of claim 7, wherein the pivot joint comprises a motorized actuator.

10. The robot of claim 7, wherein the pivot joint is a simple pivot joint comprising no motorized actuator.

11. The robot of claim 10, wherein the pivot joint comprises a biasing element that biases the at least one leg to toward the zero position.

12. The robot of claim 11, wherein the biasing element comprises a spring.

13. The robot of claim 7, wherein the at least one leg comprises multiple leg segments, each leg segment being connected to an adjacent leg segment with a joint.

14. The robot of claim 13, wherein at least one of the joints comprises a motorized actuator.

15. The robot of claim 7, wherein the FTP controller is configured to calculate the force using the measured pivot angle and a spring constant of a spring that that opposes pivoting of the pivot joint.

16. The robot of claim 7, wherein the FTP controller is further configured to determine how to manipulate the at least one leg based on the determined force and a current magnitude of foot depression.

17. The robot of claim 7, wherein the FTP controller is configured to determine how to elevate or further depress the foot based on the determined force and a current magnitude of foot depression.

* * * * *